(12) United States Patent
Ajisaka

(10) Patent No.: US 7,802,839 B2
(45) Date of Patent: Sep. 28, 2010

(54) VEHICLE BODY STRUCTURE

(75) Inventor: Satoshi Ajisaka, Okazaki (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 12/298,400

(22) PCT Filed: Nov. 9, 2007

(86) PCT No.: PCT/JP2007/071776

§ 371 (c)(1),
(2), (4) Date: Oct. 24, 2008

(87) PCT Pub. No.: WO2008/056763

PCT Pub. Date: May 15, 2008

(65) Prior Publication Data

US 2009/0102235 A1  Apr. 23, 2009

(30) Foreign Application Priority Data

Nov. 9, 2006   (JP)   .............................. 2006-303928

(51) Int. Cl.
    *B62D 25/08*   (2006.01)
(52) U.S. Cl. .............................. 296/187.09; 296/203.02
(58) Field of Classification Search ............ 296/203.02, 296/187.09, 187.1, 192, 39.3, 204; 293/106, 293/107

See application file for complete search history.

(56) References Cited

U.S. PATENT DOCUMENTS

| | | | |
|---|---|---|---|
| 3,588,158 A * | 6/1971 | Ford et al. | 293/107 |
| 4,411,462 A * | 10/1983 | Buehrig et al. | 296/187.06 |
| 5,005,898 A * | 4/1991 | Benedetto et al. | 296/193.02 |
| 5,234,246 A * | 8/1993 | Henigue et al. | 296/70 |
| 5,354,114 A * | 10/1994 | Kelman et al. | 296/192 |
| 5,921,578 A | 7/1999 | Sekita et al. | |
| 6,003,934 A * | 12/1999 | Usui | 296/203.02 |
| 6,102,465 A * | 8/2000 | Nemoto et al. | 296/39.3 |
| 6,245,408 B1 * | 6/2001 | Bitzer | 428/118 |
| 6,283,529 B2 * | 9/2001 | Kitagawa | 296/75 |

(Continued)

FOREIGN PATENT DOCUMENTS

JP        09-286354 A      11/1997

(Continued)

*Primary Examiner*—Dennis H Pedder
(74) *Attorney, Agent, or Firm*—Sughrue Mion, PLLC

(57) ABSTRACT

A vehicle body structure is provided capable of reducing load borne by front-rear members.

A vehicle front portion structure 10 includes: a pair of side frames 12, each extending in the vehicle front-rear direction and arranged parallel to each other at positions in the vehicle width direction; a dash panel 20, disposed at a position that is separated toward the rear in the vehicle front-rear direction from the front end portions 12A of the pair of side frames 12, and extending in the vehicle width direction and in the vehicle vertical direction; a division plate 25, disposed toward the front in the vehicle front-rear direction from the dash panel 20; an impact absorbing member 26, provided between the dash panel 20 and the division plate 25 so as to be able to transmit load in the vehicle front-rear direction; and support pillars 14, provided so as to be able to transmit load toward the rear in the vehicle front-rear direction to each of the side frames 12 and the division plate 25.

14 Claims, 9 Drawing Sheets

U.S. PATENT DOCUMENTS

| | | | |
|---|---|---|---|
| 6,322,440 B1 * | 11/2001 | Nakatani | 454/147 |
| 6,561,562 B1 * | 5/2003 | Hesch | 296/39.3 |
| 7,267,386 B2 * | 9/2007 | Hesch | 296/39.3 |
| 2004/0113460 A1 * | 6/2004 | Junker et al. | 296/192 |
| 2004/0227379 A1 * | 11/2004 | Yamamura et al. | 296/187.09 |
| 2005/0194773 A1 * | 9/2005 | Yamada et al. | 280/752 |

FOREIGN PATENT DOCUMENTS

| | | |
|---|---|---|
| JP | 2005-082108 A | 3/2005 |

* cited by examiner

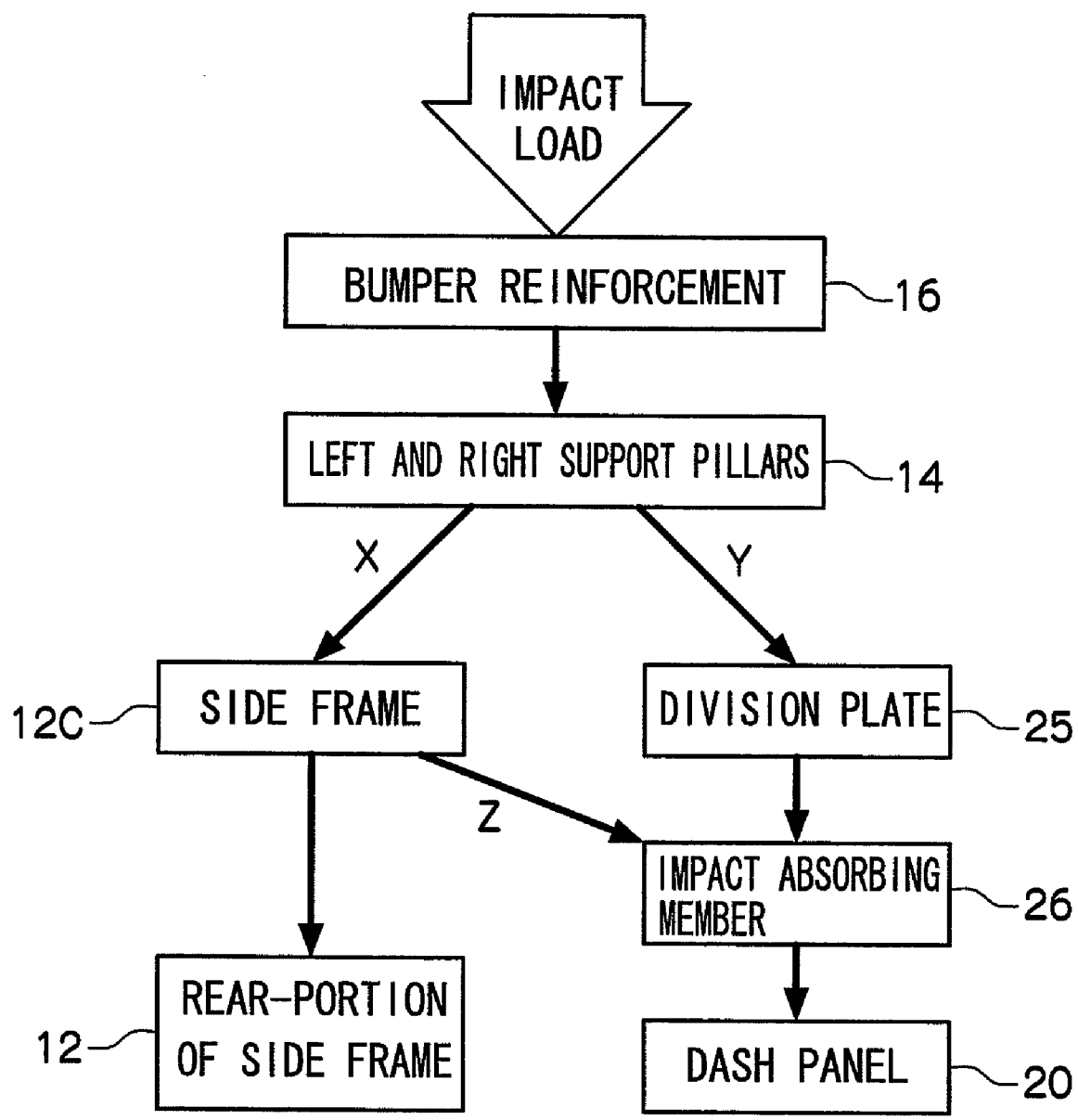

VEHICLE BODY STRUCTURE

TECHNICAL FIELD

The present invention relates to a vehicle body structure including a pair of front-rear members.

RELATED ART

A vehicle body structure is considered that includes a left-right pair of side beams and a center beam, formed into a triangular shape when viewed from the side, with a bumper connected between the front ends, and a connecting member connected between the rear ends (see, for example, Japanese Patent Application Laid-Open (JP-A) No. 9-286354). Such a vehicle body structure transmits load from the connecting member to a floor portion through a load distribution plate.

DISCLOSURE OF THE INVENTION

Problem to be Solved by the Invention

However, with conventional technology like that described above, the load transmission plate is a member provided to reduce the surface pressure of the floor portion, and there is a greater load borne by each of the side beams and the center beam at the upstream side in the load transmission direction relative to the load transmission plate.

In consideration of the above circumstances, an object of the present invention is to provide a vehicle body structure capable of reducing the load borne by the front-rear members.

Method of Solving the Problem

A vehicle body structure according to a first aspect of the present invention includes: a pair of front-rear members, each extending in the vehicle front-rear direction and arranged parallel to each other at positions in the vehicle width direction; a first wall-shaped portion, disposed at a position that is separated toward the rear from the front end in the vehicle front-rear direction of the pair of front-rear members, and extending in the vehicle width direction and the vehicle vertical direction; a second wall-shaped portion, disposed toward the front in the vehicle front-rear direction from the first wall-shaped portion; an impact absorbing portion, provided between the first wall-shaped portion and the second wall-shaped portion configured to transmit load in the vehicle front-rear direction; and a load transmitting portion, configured to transmit load toward the rear in the vehicle front-rear direction to each of the front-rear members and the second wall-shaped portion.

By the above aspect, for example, load toward the rear in the vehicle front-rear direction that has been input to the load transmitting portion is transmitted to the front-rear members and also transmitted (partially distributed) to the second wall-shaped portion. The front-rear members then transmit this load toward the rear portion of the vehicle body as an axial force. However, as the impact absorbing portion is deformed the second wall-shaped portion displaces or deforms toward the first wall-shaped portion, and the load that has been reduced by the impact absorbing portion is supported by first wall-shaped portion (transmitting or distributing the load from the first wall-shaped portion to other portions of the vehicle). Accordingly, the load toward the rear in the vehicle front-rear direction that has been input to the load transmitting portion is transmitted toward the rear of the vehicle via the path configured by the front-rear member themselves, and via the path from the second wall-shaped portion through the impact absorbing portion up to the first wall-shaped portion (in other words toward the rear). Thereby, the axial load of the front-rear members is reduced.

In this manner, the vehicle body structure according to the above aspect is capable of reducing the load borne by the front-rear members. It should be noted that at least a pair (two) of the front-rear members may be provided, and three or more thereof may also be provided. In other words, two front-rear members from plural front-rear members correspond to the pair of front-rear members of the present invention.

In the above aspect, a configuration may be provided in which the first wall-shaped portion, the second wall-shaped portion, the impact absorbing portion, and the load transmitting portion are each configured with respective portions thereof positioned above the front-rear members in the vehicle vertical direction.

By the above aspect, when load toward the rear in the vehicle front-rear direction acts on portions of the load transmitting portion that are above the front-rear members in the vehicle vertical direction, a moment acts to bend the front-rear members. Therefore, the load transmitting portion is able to transmit load toward the rear to the second wall-shaped portion in an effective manner by utilizing displacement toward the rear of the front-rear members due to bending thereof.

In the above aspect, a configuration may be provided in which the load transmitting portion comprises: a pair of upright members, each provided extending upward in the vehicle vertical direction at a portion of the respective pair of front-rear members to the front, in the vehicle front-rear direction, with respect to the second wall-shaped portion; and a cross member that spans between the pair of upright members; the second wall-shaped portion being configured of a shape that positions the front end side thereof in the vehicle front-rear direction above, in the vehicle vertical direction, relative to the rear end side thereof; and the front end side of the second wall-shaped portion in the vehicle front-rear direction being connected to the pair of upright members.

By the above aspect, for example, when load toward the rear in the vehicle front-rear direction is input to the cross member, this load is transmitted to the front-rear members through the upright members and also transmitted (partially distributed) to the second wall-shaped portion. Then the upright members displace so as to tilt toward the rear due to the load that has been input to the cross member, and the sloping shaped second wall-shaped portion may be deformed toward an upright position and press the impact absorbing portion as a whole (substantially whole area) so as to deform the impact absorbing portion substantially evenly. In particular, when load toward the rear in the vehicle front-rear direction is input to the cross member positioned above the front-rear members in the vehicle vertical direction, since there is a moment acting to bend (displace) the front-rear members, if this moment is large then displacement may be promoted of the second wall-shaped portion toward an upright position, as described above, and the impact absorbing portion may be even more effectively deformed.

In the above aspect, a configuration may be provided in which a weak portion provided to a portion of the pair of front-rear members at the front side in the vehicle front-rear direction relative to the first wall-shaped portion, the weak portion being weak with respect to a bending moment acting to bend the front-rear members so as to displace the second wall-shaped portion toward the first wall-shaped portion.

By the above aspect, when a bending-moment of a predetermined value or above acts due to a load toward the rear in the vehicle front-rear direction that has been input to the load transmitting portion, the front-rear members bend (at least a portion of the walls thereof bends) about the weak portion as the base point (trigger). The second wall-shaped portion displaces by a large amount toward the rear due to the bending of the front-rear members, and the impact absorbing portion may be more effectively deformed. In particular, in the configuration in which a bending moment acts as described above, the bending moment readily acts on the front-rear members, and the impact absorbing portion may be even more effectively deformed.

In the above aspect, a configuration may be provided in which the pair of front-rear members each formed with a linear shape along the vehicle front-rear direction.

By the above aspect, since the load transmitting portion such as described above transmits load toward the rear in the vehicle front-rear direction to the front-rear members, the front-rear members may be formed in a straight-line shape and not bent to conform to the vehicle body load input position. Thereby, for example, the front-rear members, when configured from a metal material, may be readily formed by extrusion or drawing, and, when configured from a fiber reinforced plastic or the like, the mold construction therefor may be simplified.

In the above aspect, a configuration may be provided in which at least one of the first wall-shaped portion and the second wall-shaped portion is configured with an undulating shape.

By the above aspect, since the wall-shaped portion which has an undulating shaped wall-shaped portion(s) of the first wall-shaped portion and/or the second wall-shaped portion have a high rigidity, effective load transmission (support) may be performed. In particular, in a configuration in which the first and second wall-shaped portions are made highly rigid (both having an undulating shape), the impact absorbing portion disposed between the two wall-shaped portions may be effectively deformed.

In the above aspect, a configuration may be provided in which the undulating shape of the first wall-shaped portion or of the second wall-shaped portion is configured with alternate convex portions and concave portions, each with a length direction along the vehicle width direction and disposed orthogonal to the vehicle vertical direction.

By the above aspect, undulating shaped wall-shaped portion(s) of the first wall-shaped portion and/or the second wall-shaped portion have a high rigidity in the vehicle width direction, and so the undulating shaped wall-shaped portion(s) do not readily bend at any local position in the vehicle width direction. Therefore, even if a load off-set in the vehicle width direction with respect to the load transmitting portion is input toward the rear in the vehicle front-rear direction, effective impact absorption and load transmission (distribution) may be performed.

In the above aspect, a configuration may be provided in which the impact absorbing portion configured with a rear wall disposed so as to be able to contact with the first wall-shaped portion, a front wall disposed so as to be able to contact with the second wall-shaped portion, and a plurality of front-rear ribs connecting the rear wall and the front wall.

By the above aspect, the front wall of the impact absorbing portion receives the load from the second wall-shaped portion, and transmits the load to the rear wall thereof during buckling (deformation) of the plural front-rear ribs. The impact absorbing characteristics may be set (controlled) according to the dimensional shape, number, arrangement, and the like, of the front-rear ribs.

In the above aspect, a configuration may be provided in which at least one of the rear wall and the front wall of the impact absorbing portion is formed with a convex/concave portion.

By the above aspect, a configuration may be achieved which does not readily misalign with respect to the second wall-shaped portion/first wall-shaped portion by using the convex/concave portion, with the effect that impact absorption and load transmission may be made more certain with such a configuration. In particular, a configuration is even more preferable in which a convex/concave portion is provided to the front wall/rear wall that fits into/onto the above described convex/concave portion of the second wall-shaped portion/first wall-shaped portion, obtaining a reinforcement effect of the first/second wall-shaped portion with the convex/concave portion.

In the above aspect, a configuration may be provided in which the impact absorbing portion has an air-flow channel formed in an internal portion thereof, the air-flow channel being able to direct air-flow to an air-flow receiving device.

By the above aspect, an effective utilization of the vehicle body space is achieved since the impact absorbing portion is used to configure an air-flow directing structure.

In the above aspect, a configuration may be provided in which the air-flow channel comprises an external air introduction portion that is an opening in the impact absorbing portion toward the outside of the vehicle at the upper end side in the vehicle vertical direction, or at the front end side in the vehicle front-rear direction.

By the above aspect, since there is the external air introduction portion provided to the impact absorbing portion, there is no necessity to provide an independent external air introduction portion, and the vehicle body structure may be simplified.

In the above aspect, a configuration may be provided in which the impact absorbing portion comprises a liquid storage portion capable of storing a liquid.

By the above aspect, a configuration may be achieved with a washer tank and/or radiator reservoir tank, while ensuring the impact absorbing function of the impact absorbing portion, and an effective utilization of the vehicle body space is achieved.

In the above aspect, a configuration may be provided in which the pair of front-rear members extends to the rear with respect to the first wall-shaped portion in the vehicle front-rear direction; and there is a supported body disposed supported by the vehicle body at least between the pair of front-rear members at portions thereof that are rearward of the first wall-shaped portion in the vehicle front-rear direction.

By the above aspect, the supported body may be supported by the pair of front-rear members which are portions of the vehicle body that have high rigidity.

In the above aspect, a configuration may be provided in which the supported body is a battery for supplying electrical power to an electromotor for driving the vehicle.

By the above aspect, a heavy battery (a battery unit storing a heavy battery) may be directly mounted to the front-rear members. In a configuration using the above described impact absorbing structure, which is also configured with the air-flow directing structure, a cooling system for the battery may be realized readily with a simple structure.

Effect of the Invention

The vehicle body structure according to the present invention has the superior effect of enabling a reduction in the load borne by the front-rear members, as described above.

BRIEF DESCRIPTION OF THE DRAWINGS

FIG. 5 is a schematic diagram showing schematically an impact load transmission path in the vehicle body front structure according to the first exemplary embodiment of the present invention.

BEST MODE OF IMPLEMENTING THE INVENTION

Explanation will now be given of a vehicle body front structure 10 as a vehicle body structure according to a first exemplary embodiment of the present invention, with reference to FIGS. 1 to 5. It should be noted that in the figures, the arrow FR indicates the front side in the vehicle front-rear direction (direction of progression) of a vehicle to which the vehicle body front structure 10 has been applied, the arrow UP indicates the up side in the vehicle vertical direction, and the arrow W indicates the vehicle width direction.

Figure 1:
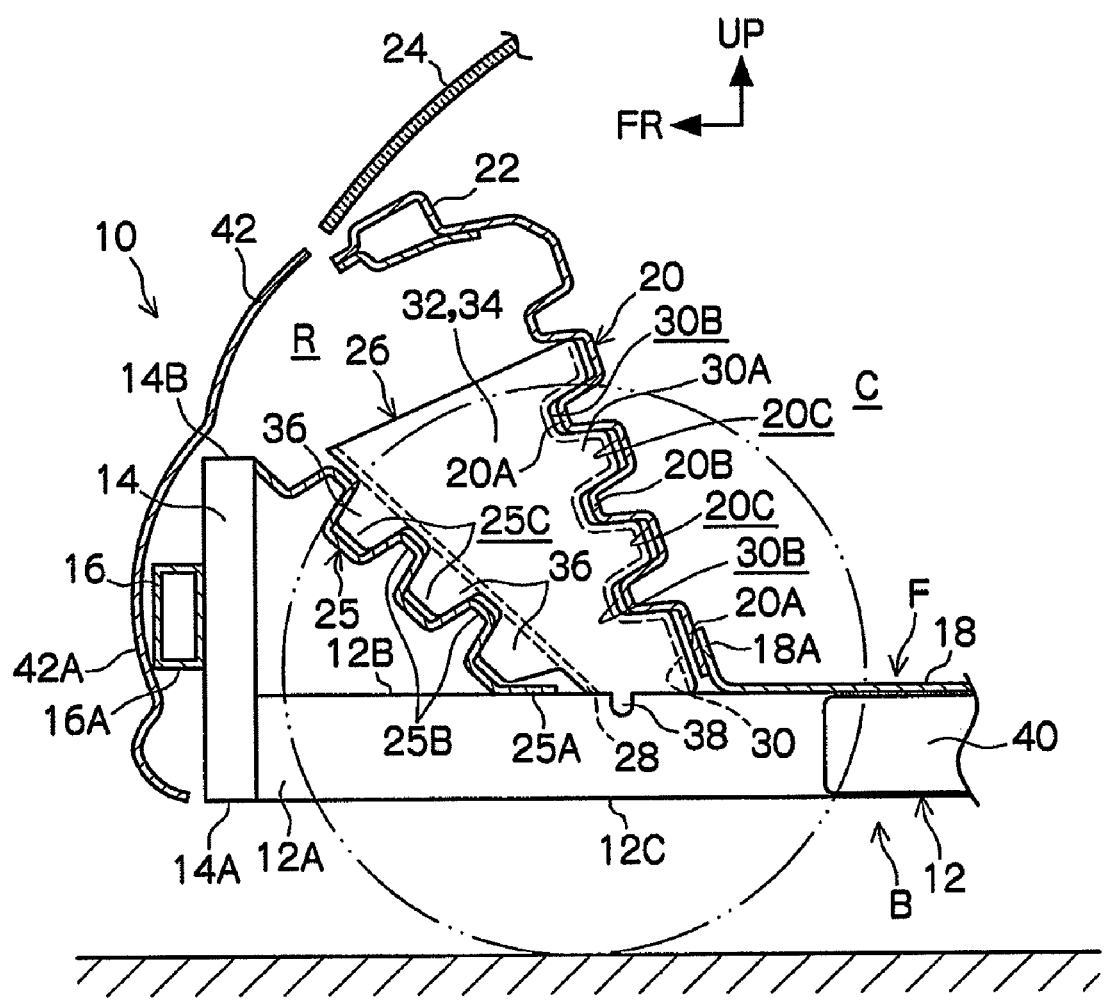
FIG. 1 is a lateral cross-section showing a vehicle body front structure according to a first exemplary embodiment of the present invention.
Figure 2:
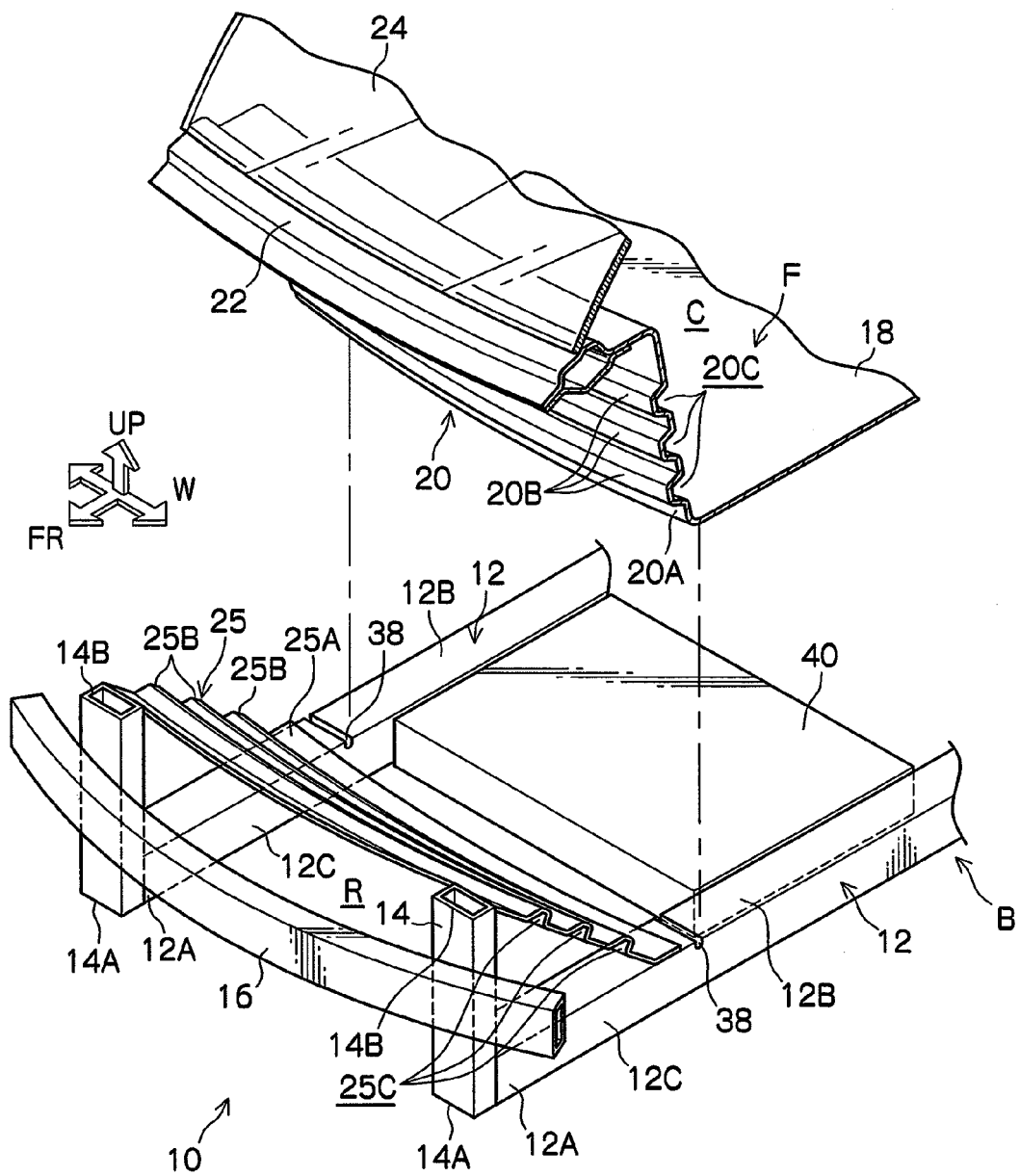
FIG. 2 is an exploded perspective view showing a vehicle body front structure according to the first exemplary embodiment of the present invention, from which an impact absorbing member has been removed.

FIG. 1 shows a lateral cross-section of a schematic overall configuration of the vehicle body front structure 10. FIG. 2 shows the vehicle body front structure 10 with an exploded perspective view of a portion thereof. As shown in these figures, the vehicle body front structure 10 is provided with side frames 12, serving as a left-right pair of front-rear members, each side frame 12 disposed with its length along the vehicle front-rear direction and arranged parallel to each other at positions in the vehicle width direction. Each of the side frames 12 is formed in a shape that does not have a curved portion, that is to say they are formed along the vehicle front-rear direction in a straight-line shape. In this exemplary embodiment, each of the side frames 12 is configured as an extrusion formed item of a metal material such as aluminum, aluminum alloy or the like, as independent structures with a closed section (rectangular frame cross-section).

There are support pillars 14, serving as upright members, provided at the respective front end portions 12A of the side frames 12. Lower portions 14A of the left and right support pillars 14 are each joined and fixed to the front face of the front end portion 12A of the respective side frame 12. Thereby, the support pillars 14 are configured with each upper end portion 14B thereof positioned above the side frame 12 in the vehicle vertical direction. In other words, each of the support pillars 14 extends upwards from the front end portion 12A of the corresponding side frame 12.

There is a front bumper reinforcement 16, serving as a cross member, fixed and joined, at portions thereof in the vicinity of the end portions in the vehicle width direction, to central portions of the left and right support pillars 14 in the vehicle vertical direction. Thereby, The portions in the vehicle vertical direction of the pair of left-right support pillars 14 above the side frame 12 are spanned across by the front bumper reinforcement 16. It should be noted that the bottom face 16A of the front bumper reinforcement 16 is positioned above the upper faces 12B of the side frames 12 in the vehicle vertical direction, and the front bumper reinforcement 16 is disposed as a whole above the side frames 12. The front bumper reinforcement 16 is formed with a curved shape so that the central portion thereof in the vehicle width direction is more forward in the vehicle front-rear direction than the end portions thereof in the vehicle width direction.

There is also a floor panel 18 joined at rear portions of the left and right side frames 12 that are rearward of each of front portions 12C, as shown in FIG. 1. The floor panel 18, as shown in FIG. 2, extends in the vehicle width direction and the vehicle front-rear direction and configures the vehicle body (cabin) floor F. A lower edge portion 20A of a dash panel 20, serving as a first wall-shaped portion, is joined to a front end 18A of this floor panel 18. The dash panel 20 extends in the vehicle vertical direction and in the vehicle width direction, and separates (partitions) a vehicle cabin C and a space R that is formed in front of the vehicle cabin C. While not shown in the figures, the dash panel 20 extends up to the outside of the left and right side frame 12 in the vehicle width direction, and each of the outside edges of the dash panel 20 in the vehicle width direction is fixed to a rocker, front pillar or the like.

The dash panel 20 is slightly tilted forward with respect to the vertical, as shown in FIG. 1, and a lower edge of a windshield glass 24 is joined to a closed cross-section structural member 22 formed at the upper edge of the dash panel 20 in the vehicle vertical direction. Furthermore, while omitted from the figures, an instrument panel is disposed at the vehicle cabin C side of an upper portion of the dash panel 20. In this exemplary embodiment, the dash panel 20 is formed to have convex/concave portions in the plate thickness direction thereof (vehicle front-rear direction), so as to form an undulating shape when viewed from the side. As shown in FIG. 2, convex portions 20B (portions protruding toward the front) and concave portions 20C (portions protruding toward the rear) of the dash panel 20 are each formed with the length thereof extending in the vehicle width direction, and these convex and concave portions are formed over substantially the entire length of the dash panel 20 in the vehicle width direction.

Furthermore, as shown in FIGS. 1 and 2, in the vehicle body front structure 10 there is a division plate 25, serving as a second wall-shaped portion, disposed in front of the dash panel 20 in the vehicle front-rear direction. The division plate 25 is disposed tilting over toward the front (angled) with respect to the vertical in side view, so as to span across between the upper end portions 14B of the support pillars 14 and intermediate portions in the vehicle front-rear direction of the front portions 12C of the side frames 12. The division plate 25 is more tilted over with respect to the vertical than the dash panel 20, and a rear lower edge 25A thereof that is joined to the side frame 12 is positioned forward of the lower edge portion 20A of the dash panel 20 in the vehicle front-rear direction. The division plate 25, as shown in FIG. 2, extends in the vehicle width direction, and spans across between the left and right side frames 12 and between the support pillars 14.

In addition, the division plate 25 of the present exemplary embodiment, is formed to have convex/concave portions in the plate thickness direction (vehicle front-rear direction), so as to form an undulating shape when viewed from the side. Convex portions 25B (portions protruding toward the rear) and concave portions 25C (protruding toward the front) of the division plate 25 are each formed with the length thereof extending in the vehicle width direction, and these convex and concave portions are formed over substantially the entire length of the division plate 25 in the vehicle width direction. The division plate 25 and the dash panel 20 in the present exemplary embodiment are each configured by press forming or the like of a metal material.

Figure 3A:
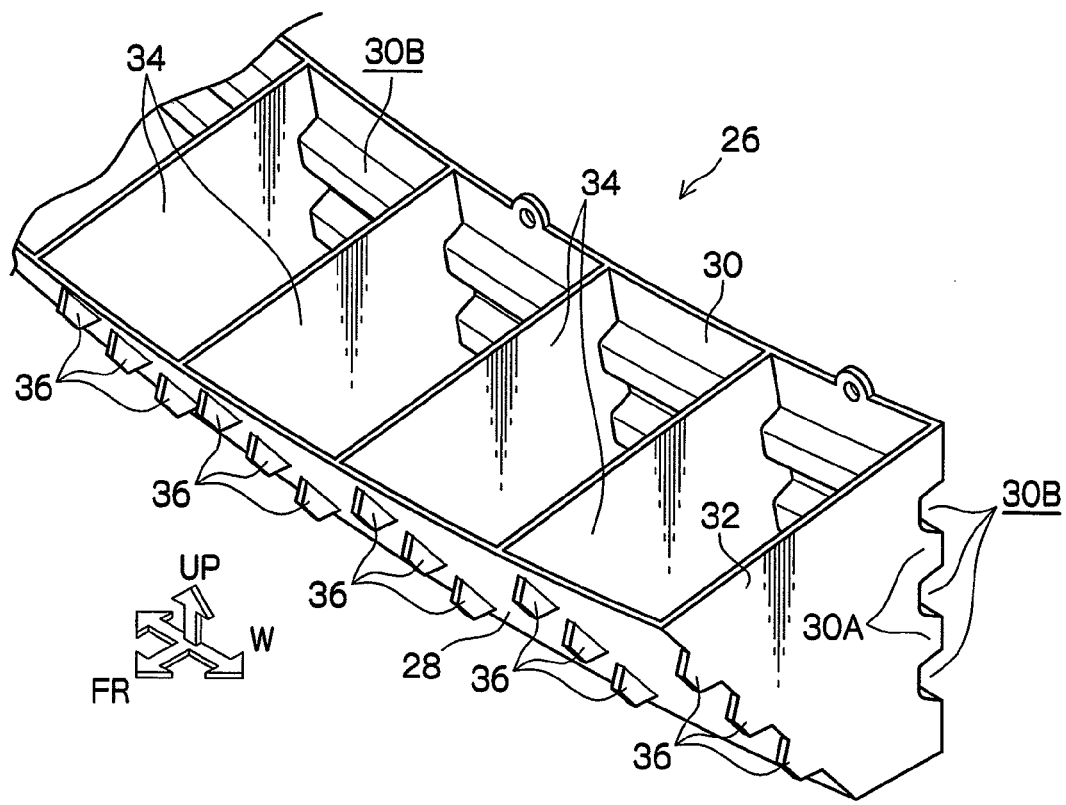
FIG. 3A is a perspective view showing an impact absorbing member configuring a vehicle body front structure according to the first exemplary embodiment of the present invention.

There is an impact absorbing member (load control member) 26, serving as an impact absorbing portion, disposed between the dash panel 20 and the division plate 25, as shown in FIG. 1. The impact absorbing member 26, as shown in FIG. 3A, is configured with principal structural parts of: a front wall 28; a rear wall 30; a pair of left-right side walls 32 (only one thereof is illustrated in FIG. 3A) connected between outside end portions in the vehicle width direction of the front wall 28 and the rear wall 30; and plural front-rear ribs 34, connected at intermediate portions in the vehicle width direction between the front wall 28 and the rear wall 30. Therefore, the impact absorbing member 26 may be thought of as being a frame shaped body configured with the front wall 28 and the rear wall 30 and the left and right side walls 32, the internal space therein being partitioned by the plural front-rear ribs 34. Furthermore, the impact absorbing member 26 may be thought of as being a structure in which the front wall 28 and the rear wall 30 are connected together by the side walls 32 and plural front-rear ribs 34 arranged at intervals along the width direction. That is to say, the pair of left and right side walls 32 may also be considered to be the front-rear ribs of the present invention.

The front wall 28 of the impact absorbing member 26 is in contact with the rear face side of the division plate 25, so as to be capable of transmitting load in the vehicle front-rear direction, and the rear wall 30 is in contact with the front face side of the dash panel 20 so as to be capable of transmitting load in the vehicle front-rear direction. That is to say, the impact absorbing member 26 is sandwiched between the dash panel 20 and the division plate 25, so as to be capable of transmitting load from the division plate 25 side to the dash panel 20 side (toward the rear in the vehicle front-rear direction).

Figure 3B:
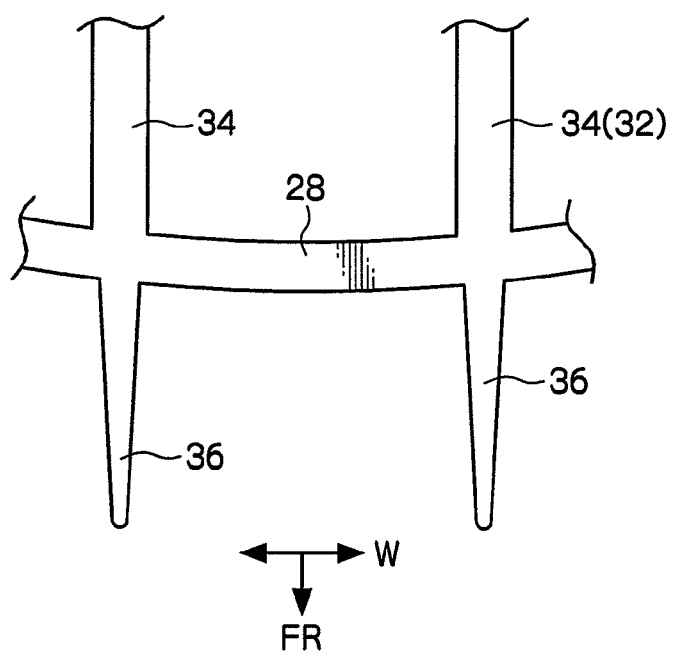
FIG. 3B is a plan view cross-section showing the impact absorbing member configuring a vehicle body front structure according to the first exemplary embodiment of the present invention.

More specifically, as shown in FIGS. 3A and 3B, the front wall 28 configuring the impact absorbing member 26 is formed with fitting ribs 36 that are localized protrusions along the vertical direction so as to form a convex/concave shape when viewed from the side. The front wall 28 is thereby formed with a convex/concave shape along the vertical direction with the top portions of the fitting ribs 36 as convex portions, and the portions where there are no fitting ribs 36 present as concave portions. The fitting ribs 36 in the present exemplary embodiment are provided at least in the positions where the side walls 32 and the front-rear ribs 34 are disposed in the vehicle width direction. As shown in FIG. 1, each of the fitting ribs 36 is fitted within a concave portion 25C of the division plate 25. In this state, the convex portions 25B of the division plate 25 are fitted between adjacent ribs of the fitting ribs 36 above and below.

On the other hand, the rear wall 30, has convex/concave portions formed in the thickness direction of the plate (the vehicle front-rear direction) so that a convex/concave shape is formed when viewed from the side, as shown in FIG. 3A. Convex portions 30A (portions protruding toward the rear) of the rear wall 30 and concave portions 30B (protruding toward the front) of the rear wall 30 are each formed with lengths thereof extending in the vehicle width direction, and are formed over substantially the entire length of the rear wall 30 in the vehicle width direction. The convex portions 30A of the rear wall 30, as shown in FIG. 1, are in a state of being fitted around by the concave portions 20C of the dash panel 20, and concave portions 30B of the rear wall 30 are fitted into by the convex portions 20B of the dash panel 20.

By the above, the impact absorbing member 26 that is sandwiched between the division plate 25 and the dash panel 20 is retained in a predetermined position, so as not to misalign, with respect to the vehicle body B (side frame 12, support pillars 14, front bumper reinforcement 16, dash panel 20, division plate 25 and the like) by the convex/concave shape of the division plate 25 and the dash panel 20 and the convex/concave shape of the front wall 28 and the rear wall 30 being fitted together. The impact absorbing member 26 as explained above is one formed with a resin material with unit each of the portions (front wall 28, rear wall 30, pair of left and right side walls 32, plural front-rear ribs 34) integrated together. Therefore, the impact absorbing member 26 is light in weight, and readily formed in a shape for obtaining the particular impact absorbing characteristics desired.

There is also a fold bead 38, serving as a weak portion, formed at the upper face 12B of the side frame 12, forward from the lower edge portion 20A of the dash panel 20, and more specifically between the lower edge portion 20A of the dash panel 20 and the rear lower edge 25A of the division plate 25. Thereby, the side frame 12 is weakened at the fold bead 38 with respect to a bending moment M shown in FIG. 4A (a moment generated by load toward the rear in the vehicle front-rear direction input to the front bumper reinforcement 16) and the fold bead 38 is configured as the trigger for the bending (folding) generation.

There is a battery 40 disposed as a supported body between the left and right side frames 12 at a portion mainly rearward of the dash panel 20 in the vehicle body B to which the vehicle body front structure 10 explained above has been applied, as shown in FIG. 2. The battery 40 is fixed and supported to the left and right side frames 12 at a non-illustrated mounting seat disposed outer peripheral (housing) portion thereof through fixing member(s) such as non-illustrated brackets or the like. This battery 40 may be understood to be an electrical power source device, which stores power for supply to a non-illustrated motor serving as a drive source in order to run the vehicle to which the vehicle body front structure 10 has been applied. In the present exemplary embodiment, the vehicle to which the vehicle body front structure 10 has been applied is an electric car configured without an engine (internal combustion engine) and transmission mounted in the space (engine compartment) in front of the dash panel 20.

In the vehicle body front structure 10, as shown in FIG. 1, the impact absorbing member 26, the support pillars 14, and the front bumper reinforcement 16 are covered from the front in the vehicle front-rear direction by a front panel 42. A lower portion 42A of the front panel 42 covering the front bumper reinforcement 16 is configured with the functionality of a bumper cover. It should be noted that a bumper cover may be provided independent of the front panel 42.

Explanation will now be given of the operation of the present exemplary embodiment.

In the vehicle body front structure 10 of the above described configuration, when the vehicle to which the vehicle body front structure 10 is applied is involved in a frontal impact, the load thereof is transmitted along a load transmission path like that shown in FIG. 5. That is to say, impact load toward the rear in the vehicle front-rear direction is input to the front bumper reinforcement 16, and this load is transmitted from the front bumper reinforcement 16 to the support pillars 14. The support pillars 14 transmit a portion of the impact load which has been transmitted thereto to the left and right side frames 12, and also transmit a separate portion of the impact load which has been transmitted thereto to the division plate 25, while tilting over toward the rear.

Figure 4A:
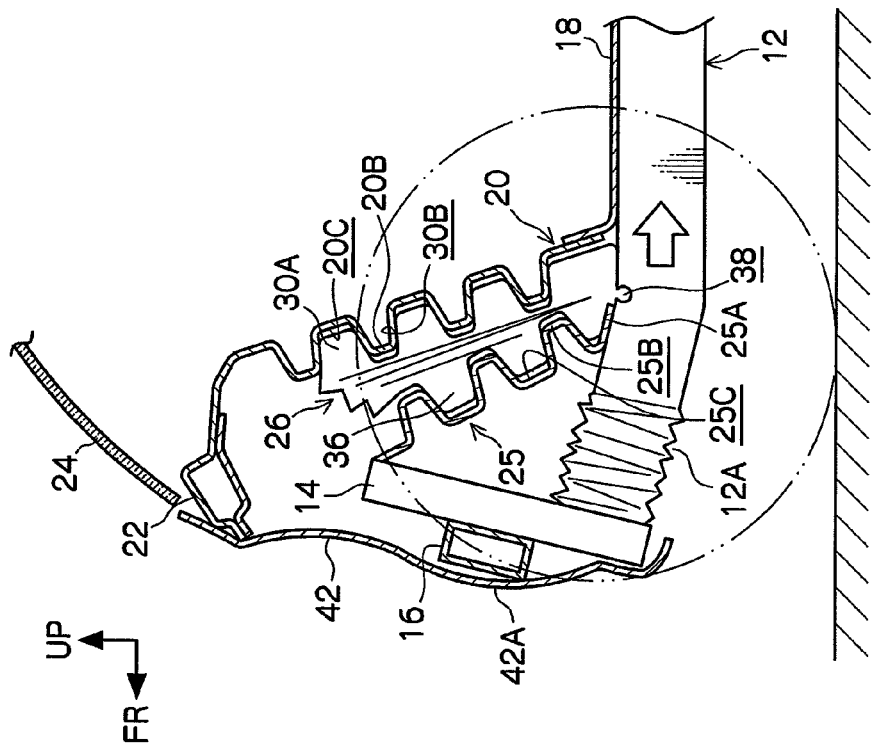
FIG. 4A is a lateral cross-section showing a load transmission path, when there is a frontal impact, in the vehicle body front structure according to the first exemplary embodiment of the present invention.
Figure 4B:
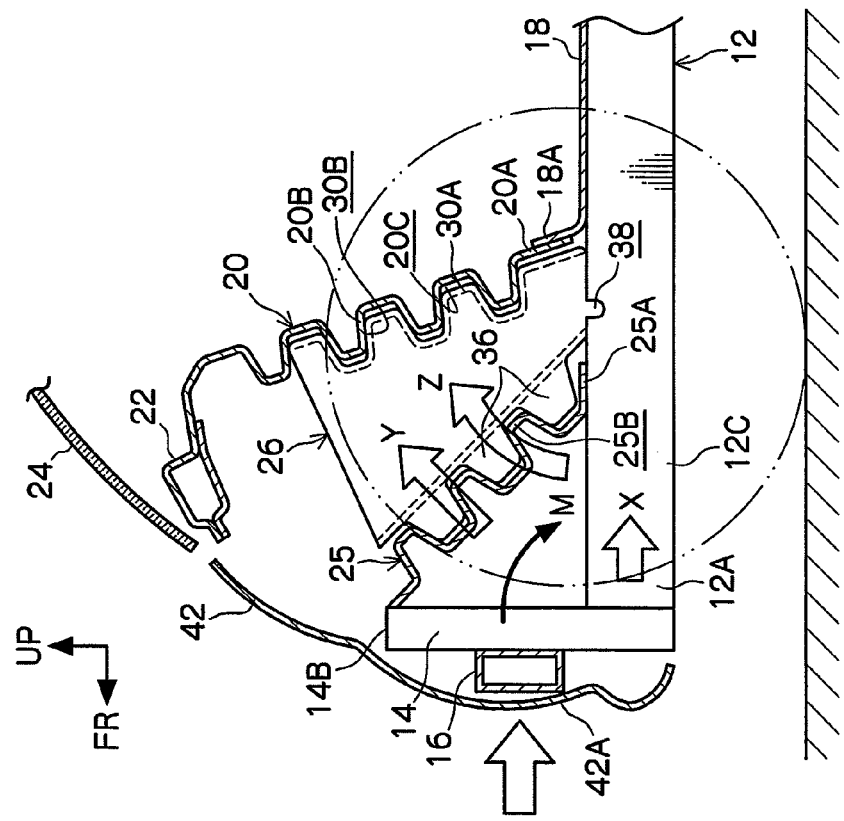
FIG. 4B is a lateral cross-section showing a deformation state due to a frontal impact in the vehicle body front structure according to the first exemplary embodiment of the present invention.

Yet another portion of the impact load that has been transmitted to the side frames 12 from the support pillars 14 is transmitted to the rear end side of the side frames 12 as an axial force (compression load) (see the load transmission path X shown in FIGS. 4A and 5). On the other hand, the impact load that has been transmitted to the division plate 25 from the support pillar 14 displaces the division plate 25 in a direction in which it is raised toward an upright position, and is transmitted to the dash panel 20 while deforming the impact absorbing member 26 (buckling the side walls 32 and the front-rear ribs 34). Impact energy is absorbed (reduced) by the deformation of the impact absorbing member 26 (see the load transmission path Y shown in FIGS. 4A and 5).

In addition, by inputting the impact load to the front bumper reinforcement 16 that is offset in the vehicle vertical direction from the side frames 12, a bending moment M acts on the side frames 12, as shown in FIG. 4A. A fold develops in the side frames 12 due to the bending moment M, in the direction of lifting up the front end portion 12A side thereof about a base point of the fold beads 38. The support pillars 14 and the division plate 25 are angularly displaced toward the rear by such folding, and the division plate 25 also presses the impact absorbing member 26 with load transferred by the bending of the side frames 12 (see the load transmission path Z in the FIGS. 4A and 5). Thereby, a portion of the impact load that has been transmitted to the side frames 12 is supported by the bending resistance of the side frames 12 and the deformation load of the impact absorbing member 26, and transmitted to the dash panel 20.

When this occurs, since, as described above, the load transmission path X transferring load from the support pillar 14 to the side frames 12 is formed in the vehicle body front structure 10, as well as the load transmission path Y transferring load to the dash panel 20 via the division plate 25, the load borne by the side frames 12 is reduced.

In particular, in the vehicle body front structure 10, since the front bumper reinforcement 16 is disposed above the side frames 12 in the vehicle vertical direction, the bending moment M develops in the side frames 12 along with the occurrence of a frontal impact of the vehicle to which the vehicle body front structure 10 is applied (vehicle body B), and the load transmission path Z is formed by this bending moment. However, since the fold beads 38 are provided to the side frames 12, the position of folding of the side frames 12 due to the bending moment M may be controlled, and effective load transfer to the impact absorbing member 26 may be performed by the folding (bending) of the side frames 12. Thereby, the load borne by the side frames 12 may be further reduced, and also effective absorption of impact energy may be performed by deformation (collapsing) of the impact absorbing member 26.

In addition, in the vehicle body front structure 10, since the division plate 25 is disposed tilted at an angle with respect to the vehicle vertical direction so as to span across between the upper end portions 14B of the support pillars 14 and the side frames 12, the load transmission path Y and the load transmission path Z are directed upward and rearward. Thereby, the impact absorbing member 26 may be effectively deformed by the load from the load transmission paths Y and Z, and more effective absorption of the impact energy may be achieved by the deformation of the impact absorbing member 26. However, since the impact absorption stroke due to deformation of the impact absorbing member 26 is in a direction that intersects with the vehicle front-rear direction, the projected dimension along the vehicle front-rear direction of the impact absorbing portion may be made smaller. It is thereby possible for the vehicle body front structure 10 to be realized in the vehicle body B with a short front-rear length, and particularly with a short front overhang.

Furthermore, in the vehicle body front structure 10, since the support pillars 14 are provided between the front end portions 12A of the side frames 12 and the front bumper reinforcement 16, or in other words, since a configuration is provided in which the front bumper reinforcement 16 positioned at a predetermined height is fixed to the front ends of the side frames, there is no need to provide a kick portion to the side frames (a portion for setting an offset in the vehicle vertical direction between the side frame front portions and the side frame rear portions), and a configuration may be realized in which the side frames 12 are formed in a straight-line shape along the vehicle front-rear direction. Thereby, the side frames 12 may be formed from a metal material as extrusion formed items. Furthermore, since there is no kick portion provided, the reinforcing normally required for a kick portion becomes unnecessary, and an increase in weight may be suppressed.

In addition, in the vehicle body front structure 10, the rigidity of the dash panel 20 and the division plate 25 is high, since the dash panel 20 and the division plate 25 are formed with undulating shapes. Therefore, the division plate 25 may effectively transmit load from the support pillars 14 to the impact absorbing member 26, and the dash panel 20 may effectively support load from the impact absorbing member 26. Accordingly, in the vehicle body front structure 10, the deformation of the impact absorbing member 26 may be ensured when a vehicle, to which the vehicle body front structure 10 is applied, is involved in a frontal impact. In particular, the convex portions 20B and the concave portions 20C of the dash panel 20 are provided across substantially the entire length of the dash panel 20 in the vehicle width direction, the convex portions 25B and the concave portions 25C of the division plate 25 are provided across substantially the entire length of the division plate 25 in the vehicle width direction, so there is high rigidity of the dash panel 20 and the division plate 25 against bending in the vehicle width direction (the respective central portions in the vehicle width direction are not readily bent by folding). This means that even in an offset frontal impact, load may be transmitted to the impact absorbing member 26 while being distributed over a wide region of the front wall 28 from the division plate 25, with effective absorption of the impact energy.

Furthermore, since the vehicle body front structure 10 is configured with the convex/concave shape formed at the front wall 28 and the rear wall 30 of the impact absorbing member 26 (fitting ribs 36, convex portions 30A, concave portions 30B) fitting into the undulating shape of the dash panel 20 and the division plate 25, misalignment of the impact absorbing member 26 to the dash panel 20 and the division plate 25, that is misalignment to the vehicle body, may be prevented, and deformation of the impact absorbing member 26 may be even more certain during a frontal impact of the vehicle to which the vehicle body front structure 10 is applied. Furthermore, the rigidity of the dash panel 20, division plate 25, may be raised further by the rigidity reinforcement effect of the undulating shape of the front wall 28 and rear wall 30 of the impact absorbing member 26 fitted together with the undulating shape of the dash panel 20 and the division plate 25.

In addition, since the front wall 28 and the rear wall 30 of the impact absorbing member 26 in the vehicle body front structure 10 are configured with the side walls 32, and front-rear ribs 34 connecting them together, or in other words, since the structure is one in which impact energy is absorbed by buckling of the side walls 32 and the front-rear ribs 34, the impact absorbing characteristics may be set (controlled) by the dimensions/shape, the numbers, the placement and the like of the side walls 32 and the front-rear ribs 34.

In addition, since the battery 40 is disposed between the side frames 12 in the vehicle body front structure 10, the heavy battery 40 may be strongly fixed and mounted to the high rigidity left and right side frames 12.

Second Exemplary Embodiment

Explanation will next be given of a second exemplary embodiment of the present invention, with reference to the FIGS. 6 to 9. It should be noted that components and portions which are basically the same as those of the first exemplary embodiment are allocated the same reference numerals as those of the first exemplary embodiment, and explanation and illustration thereof is sometimes omitted.

Figure 6:
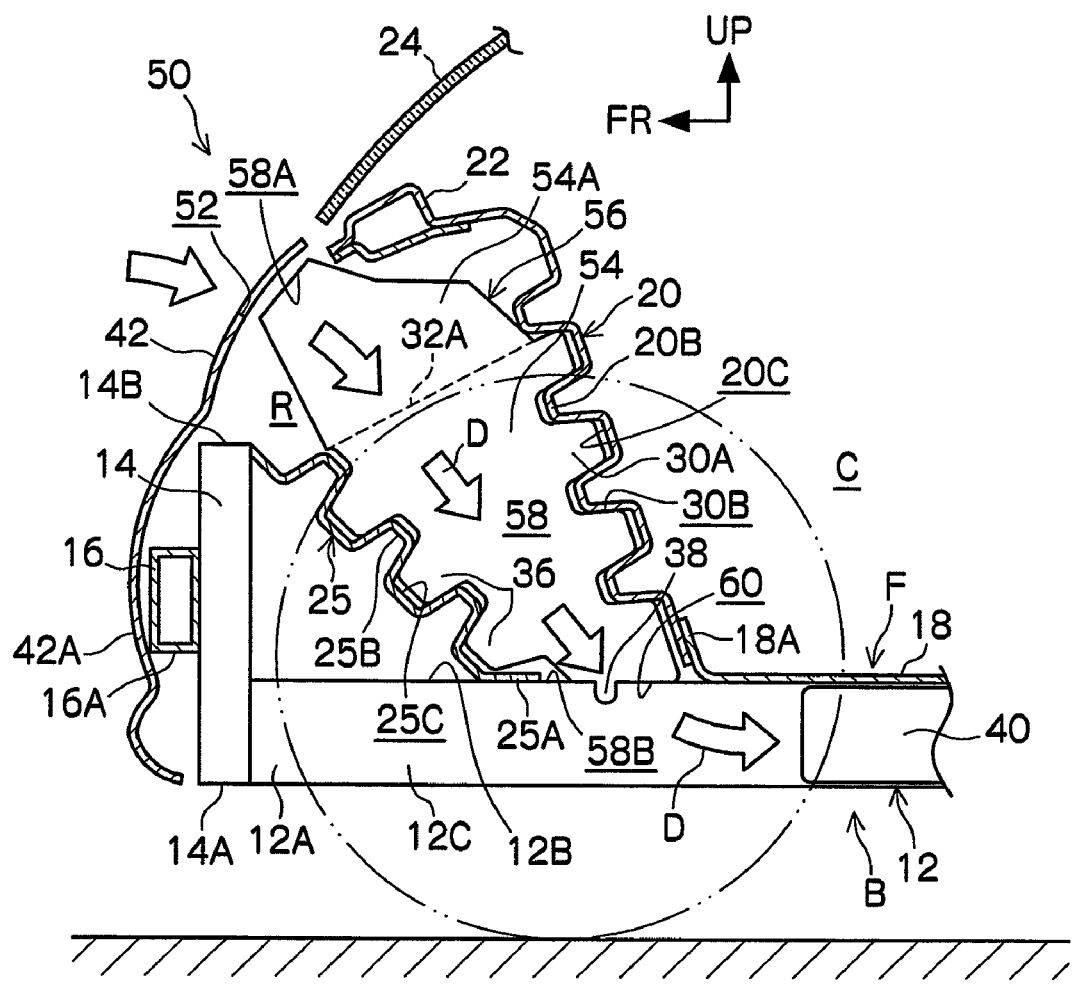
FIG. 6 is a lateral cross-section showing a vehicle body front structure according to a second exemplary embodiment of the present invention.
Figure 9:
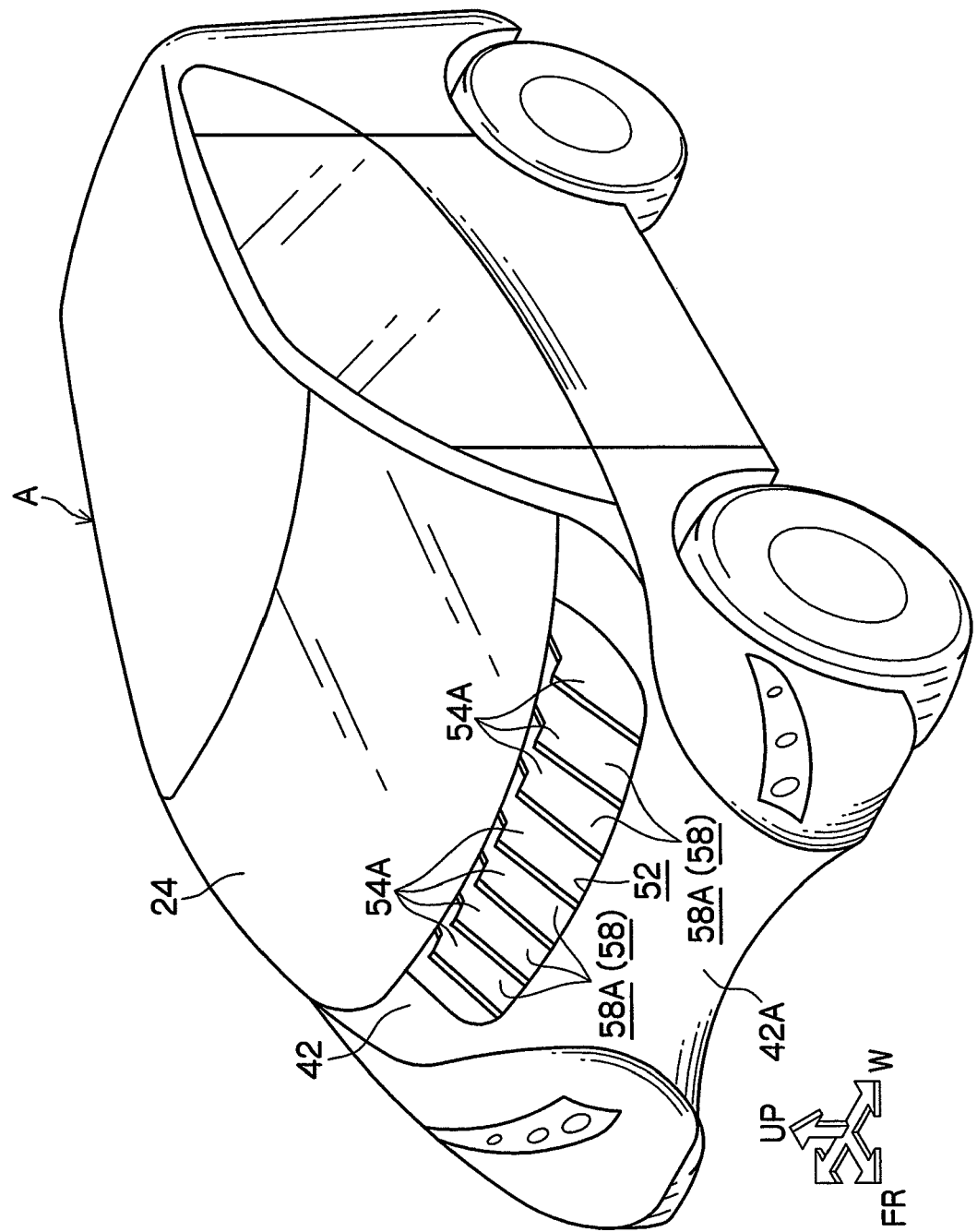
FIG. 9 is a perspective view showing an automobile to which the vehicle body front structure according to the second exemplary embodiment of the present invention has been applied.

FIG. 6 shows a lateral cross-section of a vehicle body front structure 50 according to a second exemplary embodiment of the present invention, corresponding to FIG. 1. FIG. 9 shows a perspective view of the outside of an automobile A to which the vehicle body front structure 50 has been applied. As may be seen in this figure, the vehicle body front structure 50 is different from the vehicle body front structure 10 according to the first exemplary embodiment in that an impact absorbing member 56 is provide, including front-rear ribs 54 exposed so as to be able to take in air from opening portions 52 of the front panel 42, in place of the impact absorbing member 26. This will now be specifically explained.

Figure 8:
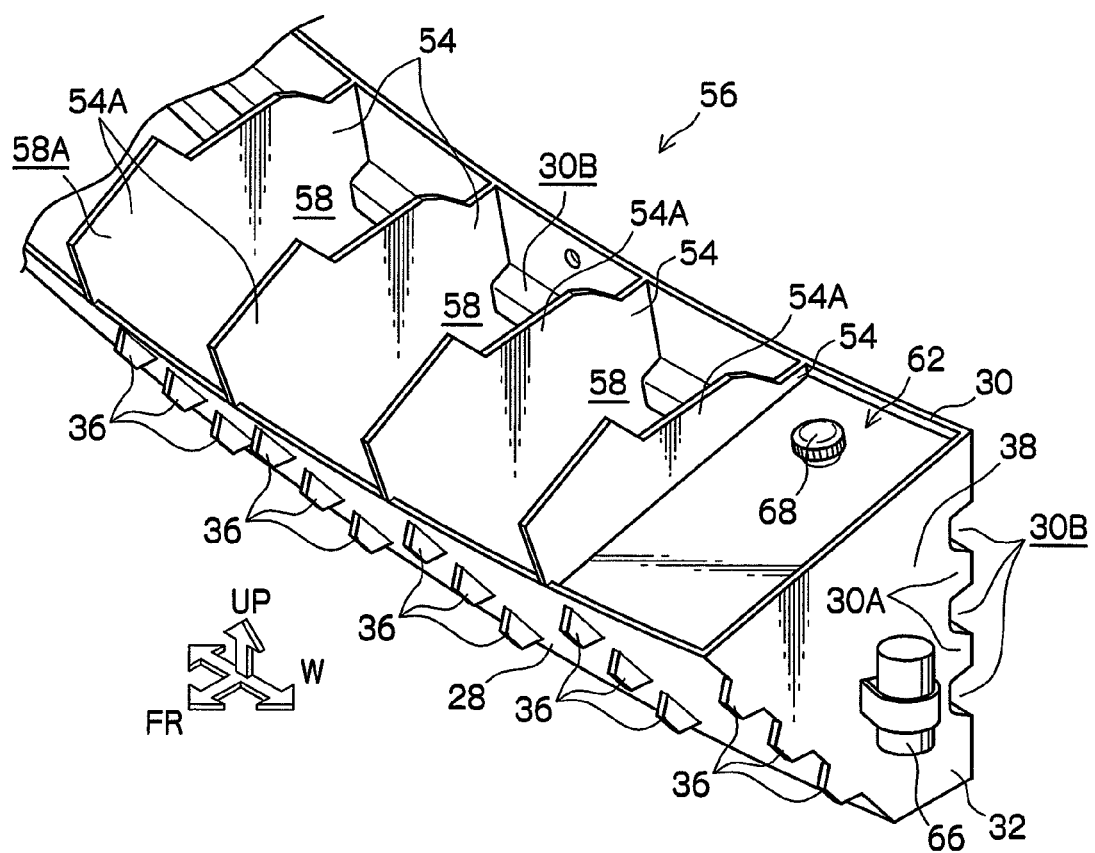
FIG. 8 is a perspective view showing the impact absorbing member configuring the vehicle body front structure according to the second exemplary embodiment of the present invention.

As shown in FIGS. 6 and 8, the front-rear ribs 54 include louver portions 54A extending further up in the vehicle vertical direction than upper edges 32A of the side walls 32, and the louver portions 54A of the front-rear ribs 54 are exposed to the outside of the vehicle through the opening portions 52 that are disposed in a portion of the front panel 42 directly below the windshield glass 24. Accordingly, in the impact absorbing member 56, duct portions 58, serving as air-flow channels, are formed between the front-rear ribs 54, with external air intakes 58A, serving as external air introduction portions, capable of taking in air from outside through the opening portions 52. As shown in FIG. 6, in the impact absorbing member 56, in other words at the bottom end of the duct portions 58, there are air exhaust outlets 58B, surrounded by the front wall 28, the rear wall 30 and the front-rear ribs 54.

Figure 7:
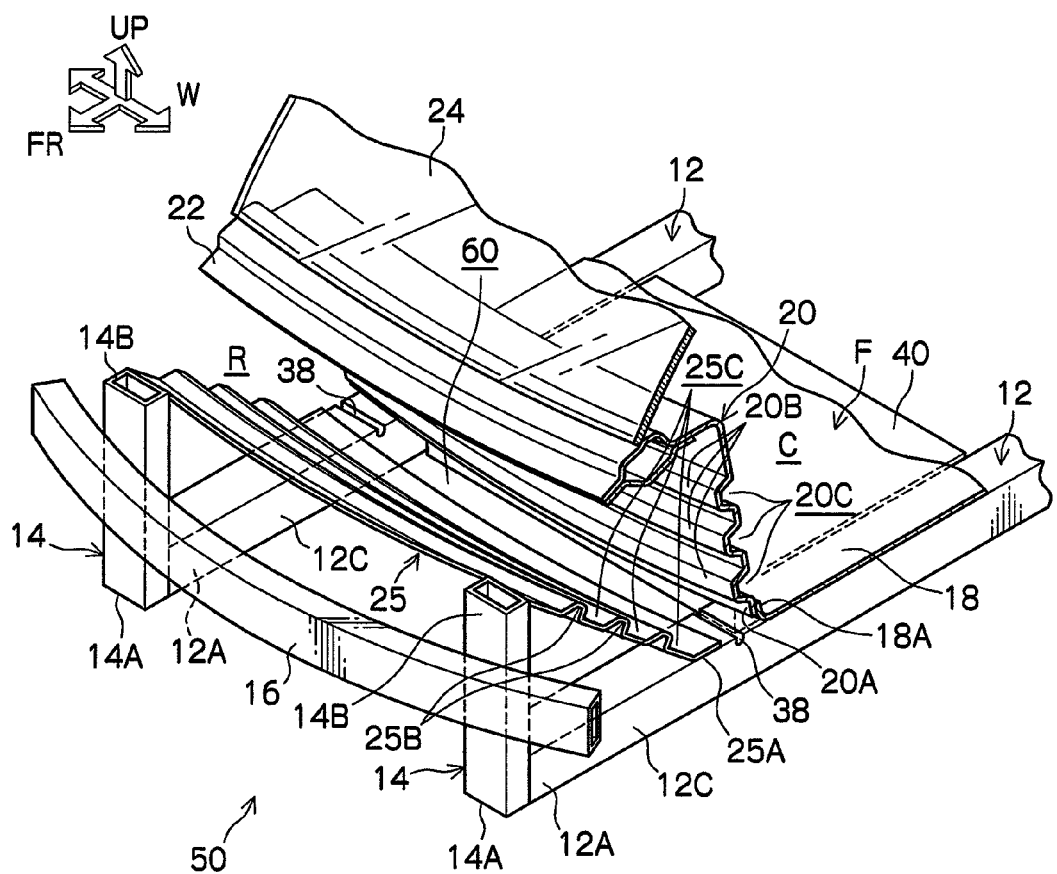
FIG. 7 is perspective view showing the vehicle body front structure according to the second exemplary embodiment of the present invention, from which an impact absorbing member has been removed.

There is also, as shown in FIG. 7, an air introduction hole 60 formed between the lower edge portion 20A of the dash panel 20 and the rear lower edge 25A of the division plate 25. The duct portions 58 of the impact absorbing member 56 are thereby in communication with the air introduction hole 60, and air that has been guided into the duct portions 58 from the external air intakes 58A, passes through the air exhaust outlets 58B and is exhausted from the air introduction hole 60. Configuration is thereby made such that, at the air exhaust outlets 58B, air that has been guided in from the external air intake 58A with the progression of the automobile A and that is exhausted from the air exhaust outlets 58B, is directed at the battery 40, as shown by arrow D in FIG. 6. It should be noted that a baffle plate, or the like, may be disposed between the side frames 12 at a lower portion of the air introduction hole 60, for guiding air exhausted from the air introduction hole 60 toward the rear along the vehicle front-rear direction.

Furthermore, as shown in FIG. 8, there is a washer tank 62, serving as a liquid storage portion, formed integrally with the impact absorbing member 56. The washer tank 62 is disposed in a portion of the impact absorbing member 56 that is not exposed to the outside through the opening portions 52 of the front panel 42. In this exemplary embodiment, the washer tank 62 is formed as a space surrounded by one of the side walls 32, the front-rear rib 54 adjacent to that side wall 32 in the vehicle width direction, the front wall 28, the rear wall 30, a top plate 64, and a non-illustrated base plate. The washer tank 62 is configured so store a washing liquid for spraying on the windshield glass 24 or the like, and operation of a washer pump (pump with motor) 66 that is fixed at a lower portion of the configuring side wall 32 supplies washing liquid to a non-illustrated spray nozzle. There is a washing liquid inlet 68 provided in the top plate 64. It should be noted that the washer tank 62 may, for example, be configured so as to store rain water that has permeated in through the louver portions 54A from the opening portions 52 of the front panel 42.

Other elements of the impact absorbing member 56 are similar to the corresponding elements of the impact absorbing member 26. The impact absorbing member 56 is configured out of a resin material, and so the washer tank 62 may readily be formed integrally therewith. The other elements of the vehicle body front structure 50 according to the second exemplary embodiment are similar to the corresponding elements of the vehicle body front structure 10 according to the first exemplary embodiment.

Accordingly, against a frontal impact of the automobile A, a similar effect may also obtain in the vehicle body front structure 50 according to the second exemplary embodiment by operation in a similar manner to that of the vehicle body front structure 10 of the first exemplary embodiment.

Furthermore, in the vehicle body front structure 50, air introduced to the duct portions 58 from the external air intakes 58A accompanying the progress of the automobile A, is directed to the battery 40 via the air exhaust outlets 58B and the air introduction hole 60. The battery 40 is cooled thereby. In the vehicle body front structure 50, since the duct portions 58 is provided to the impact absorbing member 56 in this manner, both an impact absorbing function and an air-flow guiding function may be realized in the single impact absorbing member 56. In other words, since the impact absorbing portion of the impact absorbing member 56 is used for configuring the duct portions 58, effective utilization of the internal space of the automobile A is achieved. However, since the front-rear ribs 54 (louver portions 54A) configuring the external air intakes 58A are exposed to the outside through the opening portions 52 of the front panel 42, the opening portions 52 of the front panel 42 may be configured simply without providing a separate cowl portion (cowl louver), and a structure that directs air-flow from the vehicle motion to the position of the air using member is realized. A structure is realized in this exemplary embodiment for cooling the battery 40 by air-flow from the motion of the vehicle.

Furthermore, as described above, in the automobile A (vehicle body B) to which the vehicle body front structure 50 has been applied, since air for cooling the battery 40 is directed to the air introduction hole 60 from the opening portions 52 of the front panel 42, a configuration may be realized which does not have through air-flow holes provided in the lower portion 42A of the front panel 42 (bumper cover). In such a configuration, the air resistance of the automobile A may be reduced, that is to say an increase in the fuel economy may be achieved. Moreover, since there is no need to provide through air-flow holes in the lower portion 42A of the front panel 42, the degrees of freedom for design are also increased. It should be noted that a mesh-shaped member or the like may be provided between the front-rear ribs 54 (duct portions 58) of the impact absorbing member 56 in order to prevent foreign objects, such as dried leaves of the like, being sucked therein.

In addition, in the vehicle body front structure 50, since the washer tank 62 is provide integrally to the impact absorbing member 56, or in other words, since the washer tank 62 is modularized with the impact absorbing member 56, the productivity of vehicle assembly may be improved. Furthermore, since the washer tank 62 is configured using an impact absorbing portion of the impact absorbing member 56, effective internal space utilization of the automobile A is achieved.

It should be noted that in the second exemplary embodiment, an example has been given in which air introduced from the duct portions 58 is used for cooling the battery 40, serving as an air-flow receiving device, however, the present invention is not limited thereto, and a configuration may be made, for example, in which the duct portions 58 are used as air-flow channels for an air conditioner (HVAC), serving as the air-flow receiving device.

Furthermore, in the second exemplary embodiment an example has been shown in which the duct portions 58 direct air-flow accompanying the vehicle motion to the battery 40 or an air conditioner, however, the present invention is not limited thereto, and a configuration may be made, for example, in which a fan is provided for directing air through the duct portions 58 to the battery 40 or the air conditioner. In such a configuration, air may be directed to the battery 40 and the air conditioner even when the automobile A is stationary.

In addition, in each of the exemplary embodiments described above, examples were given in which the battery 40, serving as the supported body, was disposed between the side frames 12. However, the present invention is not limited thereto, and, for example, configuration may be made with an air conditioner (HVAC unit), serving as the support body, disposed between the side frames 12, either in place of the battery 40 or together with the battery 40.

In addition, in each of the exemplary embodiments described above, examples were given in which the impact absorbing member 26, 56 were made from a resin. However, the present invention is not limited thereto and, for example, the impact absorbing member 26, 56 may be configured from a metal.

EXPLANATION OF THE REFERENCE NUMERALS

10 vehicle body front structure
12 side frame (front-rear member)
14 support pillar (upright member, load transmitting portion)
16 front bumper reinforcement (cross member, load transmitting portion)
20 dash panel (first wall-shaped portion)
20C concave portion (undulating shape)
20B convex portion (undulating shape)
25 division plate (second wall-shaped portion)
25C concave portion (undulating shape)
25B convex portion (undulating shape)
26 impact absorbing member (impact absorbing portion)
28 front wall
30 rear wall
30B concave portion (convex/concave portion)
30A convex portion (convex/concave portion)
32 side wall
34 front-rear rib
36 fitting rib (convex/concave portion)
38 fold bead (weak portion)
40 battery (supported portion, air-flow receiving device)
50 vehicle front portion structure
54 front-rear rib
56 impact absorbing member
58 duct portion
58A external air intake (external air introduction portion)
62 washer tank (liquid storage portion)

The invention claimed is:

1. A vehicle body structure comprising:
a pair of front-rear members, each extending in the vehicle front-rear direction and arranged parallel to each other at positions in the vehicle width direction;
a first wall-shaped portion, disposed at a position that is separated toward the rear from the front end in the vehicle front-rear direction of the pair of front-rear members, and extending in the vehicle width direction and the vehicle vertical direction;
a second wall-shaped portion, disposed toward the front in the vehicle front-rear direction from the first wall-shaped portion;
an impact absorbing portion, provided between the first wall-shaped portion and the second wall-shaped portion configured to transmit load in the vehicle front-rear direction; and
a load transmitting portion, configured to transmit load toward the rear in the vehicle front-rear direction to each of the front-rear members and the second wall-shaped portion,
wherein a front end side of the second wall-shaped portion is connected to the load transmitting portion, a rear end side of the second wall-shaped portion is connected to the pair of front-rear members and a front end of the pair of front-rear members is connected to the load transmitting portion, such that the load transmitting portion, the second wall-shaped portion and the pair of front-rear members form a substantially triangular shape.

2. The vehicle body structure according to claim 1, wherein the first wall-shaped portion, the second wall-shaped portion, the impact absorbing portion, and the load transmitting portion are each configured with respective portions thereof positioned above the front-rear members in the vehicle vertical direction.

3. The vehicle body structure according to claim 1, wherein the load transmitting portion comprises:
 a pair of upright members, each provided extending upward in the vehicle vertical direction from the front end of the respective pair of front-rear members, in the vehicle front- rear direction, with respect to the second wall-shaped portion; and a cross member that spans between the pair of upright members;
 the second wall-shaped portion being configured of a shape that positions the front end side thereof in the vehicle front-rear direction above, in the vehicle vertical direction, relative to the rear end side thereof; and the front end side of the second wall-shaped portion in the vehicle front-rear direction being connected to an upper end of the pair of upright members.

4. The vehicle body structure according to claim 1, wherein there is a weak portion provided to a portion of the pair of front-rear members at the front side in the vehicle front-rear direction relative to the first wall-shaped portion, the weak portion being weak with respect to a bending moment acting to bend the front-rear members so as to displace the second wall-shaped portion toward the first wall-shaped portion.

5. The vehicle body structure according to claim 1, wherein the pair of front-rear members are each formed with a linear shape along the vehicle front-rear direction.

6. The vehicle body structure according to claim 1, wherein at least one of the first wall-shaped portion and the second wall-shaped portion is configured with an undulating shape.

7. The vehicle body structure according to claim 6, wherein the undulating shape of the first wall-shaped portion or of the second wall-shaped portion is configured with alternate convex portions and concave portions, each with a length direction along the vehicle width direction and disposed orthogonal to the vehicle vertical direction.

8. The vehicle body structure according to claim 1, wherein the impact absorbing portion is configured with a rear wall disposed so as to be able to contact with the first wall-shaped portion, a front wall disposed so as to be able to contact with the second wall-shaped portion, and a plurality of front-rear ribs connecting the rear wall and the front wall.

9. The vehicle body structure according to claim 8, wherein at least one of the rear wall and the front wall of the impact absorbing portion is formed with a convex/concave portion.

10. The vehicle body structure according to claim 1, wherein the impact absorbing portion has an air-flow channel formed in an internal portion thereof, the air-flow channel being able to direct air-flow to an air-flow receiving device.

11. The vehicle body structure according to claim 10, wherein the air-flow channel comprises an external air introduction portion that is an opening in the impact absorbing portion toward the outside of the vehicle at the upper end side in the vehicle vertical direction, or at the front end side in the vehicle front-rear direction.

12. The vehicle body structure according to claim 1, wherein the impact absorbing portion comprises a liquid storage portion capable of storing a liquid.

13. The vehicle body structure according to claim 1, wherein the pair of front-rear members extends to the rear with respect to the first wall-shaped portion in the vehicle front-rear direction; and
 there is a supported body disposed supported by the vehicle body at least between the pair of front-rear members at portions thereof that are rearward of the first wall-shaped portion in the vehicle front-rear direction.

14. The vehicle body structure according to claim 13, wherein the supported body is a battery for supplying electrical power to an electromotor for driving the vehicle.

* * * * *